Jan. 17, 1956 W. V. KENNEDY 2,731,153
FILTER FOR LIQUIDS
Filed Feb. 16, 1954

*INVENTOR.*
WALTER V. KENNEDY
BY
Charles C. Willson
ATTORNEY

United States Patent Office 2,731,153
Patented Jan. 17, 1956

2,731,153

FILTER FOR LIQUIDS

Walter V. Kennedy, Central Falls, R. I., assignor to Fram Corporation, Providence, R. I., a corporation of Rhode Island Application February 16, 1954, Serial No. 410,674

1 Claim. (Cl. 210—165)

This invention relates to filters for liquids and more particularly to a filter for volatile liquids such as the gasoline used in internal combustion engines, although this filter may be used to filter other volatile liquids.

It is well known that if a filter medium having small enough apertures to do a good filtering job is used to filter volatile liquids such as gasoline, such filter medium will pass liquids much more freely than it will gases such as air, or the vapor thrown off by gasoline. This resistance offered by filter mediums to the passage of a gas, particularly when the filter is wet, tends to produce a vapor lock that will depress the level of the gasoline being delivered to the filter and prevent it from reaching the engine, thus causing the engine to stall.

A primary object of the present invention is to provide a simple and inexpensive gasoline filter which will effectively remove water and dirt from the gasoline supplied thereto, and which will not vapor-lock.

A more specific object of the invention is to provide a filter for liquids comprising a casing, formed of a head and a bowl secured thereto and having mounted in the bowl an assembled filter unit that is simple and inexpensive in construction and can be readily installed and removed from the filter casing.

The above and other features of the present invention will be further understood from the following description when read in connection with the accompanying drawing, wherein.

Figure 3:
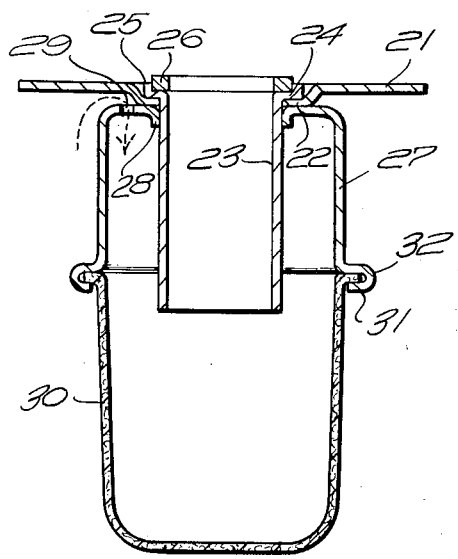
Figure 4:
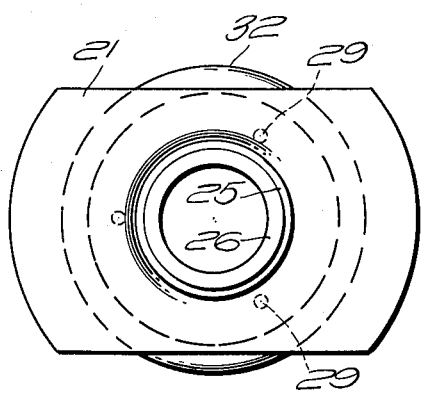

Fig. 3, on a larger scale, is a vertical sectional view through the assembled filter unit removed from its filter casing; and Fig. 4 is a top plan view of Fig. 3.

Figure 1:
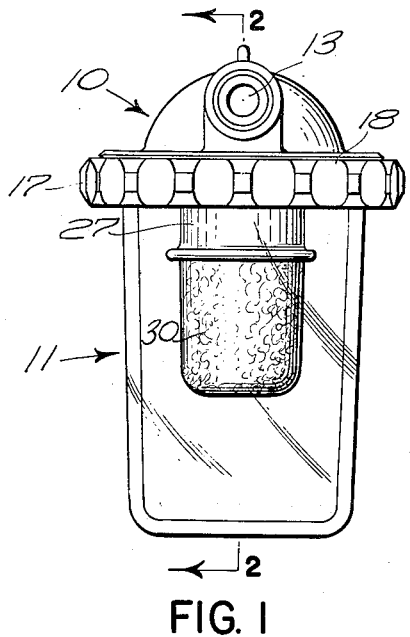
Fig. 1 is a side elevation of a filter constructed in accordance with the present invention and comprising a metal head and glass bowl through which the filter unit within the casing can be seen.
Figure 2:
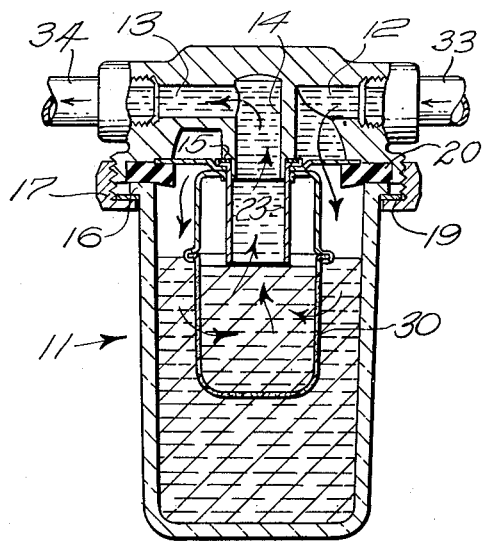
Fig. 2 is a sectional view taken on the line 2—2 of Fig. 1.

In the embodiment of the invention illustrated in the drawing, the filter casing shown in Figs. 1 and 2 of the drawing comprises a head 10 and a glass bowl 11 suspended from the head. The head 10, as shown, comprises a metal casting having an inlet passage 12 and an outlet passage 13, and the outlet passage is provided at its inner end with a downwardly extending central tube 14, the lower end of which is preferably reduced in outside diameter to form the shoulder 15 that serves to receive a central downwardly extending sleeve to be described. The arrangement is such that the gasoline to be filtered and which is supplied to the filtering device of the present invention by a gasoline pump, not shown, will enter through the passage 12 as indicated by the arrows to pass downwardly within the bowl 11, and after this liquid has been filtered by the means to be described, it passes upwardly through a central tube 14 to leave the head through the outlet passage 13, as indicated by the arrows.

The bowl 11 is preferably formed of glass so that the contents of this bowl may be readily seen, and the amount of water or dirt accumulated therein noted, and also the condition of the filter element can be observed. This bowl 11 is provided at its upper end with an outwardly extending annular flange 16 adapted to be engaged by an internally threaded clamping nut 17 which has threaded engagement with the lower threaded portion of the head 10. This nut 17 has a rough outer surface 18 which can be firmly gripped in the hand to turn the nut, and an inwardly extending annular rim adapted to form a support for the flange 16 of the bowl 11. A thin gasket 19 is preferably provided between the rim just mentioned and the flange 16. A relatively thick gasket such as a rubber ring 20 is provided between the upper end of the glass bowl 11 and the annular seat provided in the head 10 to receive this bowl, so that when the nut 17 is screwed tightly in place, a liquid and gas-tight joint will be formed between the head 10 and the bowl 11.

Having described the liquid confining casing formed of the head 10 and the bowl 11, the filter unit which is completely assembled before it is mounted in this casing will now be described. This unit, as best shown in Fig. 3, comprises a supporting member or bridge member 21 having a central hole and an annular depressed rim 22. Within this central hole is mounted a sleeve 23 and the upper end of this sleeve is provided with an outwardly extending annular flange 24 adapted to rest upon the depressed rim 22 as shown. This flange 24 is preferably turned upwardly slightly at its outer periphery as at 25 so that it will surround and help secure a small gasket 26 in place. The sleeve 23 is surrounded by an inverted cup 27, and the upper laterally extending wall of this cup has a central hole and a downwardly deflected flange 28 that tightly embraces the sleeve 23 and locks the cup firmly thereto in the position in which it is shown in Fig. 3. The arrangement is such that the upper end wall of this cup is spaced slightly from the bridge 21, as shown, and this upper end wall is provided with one or more small apertures 29 that form vapor vents.

The lower end of the cup 27 has secured thereto a porous filter cup 30 formed of fibrous material molded to the shape shown, and in the construction shown this filter cup, which is shaped like a thimble, is provided at its upper end with an outwardly extending flange 31. The lower end of the inverted cup 27 is beaded as indicated by 32, and this bead is bent into gripping engagement with the flange 31 of the filter cup.

The bridge 21, sleeve 23, and inverted cup 27 are preferably formed of thin metal, and this complete unit shown in Fig. 3 is conveniently clamped in its operating position within the casing 10, 11 by causing the outer ends of the bridge member 21 to be gripped between the thin gasket 19 and the adjacent face of the head 10, as shown in Fig. 2. When the bridge member is so clamped in place, it will yieldingly hold the gasket 26 pressed firmly against the shoulder 15 of the central tube 14 to form a tight seal thereagainst, with the result that the inverted cup 27 forms a partition between the inlet passage 12 and outlet passage 13. As a result, under normal conditions, the gasoline which enters through the passage 12 must pass through the filter cup 30 before it can reach the outlet passage 13. The level of the liquid within the bowl 11 will normally lie at about the upper end of the porous filter cup 30 outside of this cup, and at about the lower end of the sleeve 23 inside this cup, as shown in Fig. 2; but it will be understood that this level outside of the filter cup will move up and down as the pressure of the air or gasoline vapor resting thereupon varies.

When an automobile engine is running and gasoline is being supplied by the filter shown to the engine carburetor, the outlet passage 13 and passage within the tube 14 and the sleeve 23 will be full of gasoline as shown, with possibly a few bubbles of air or gasoline vapor passing upwardly through this column of liquid. Gasoline is supplied to the inlet passage 12 by a pipe 33, and gasoline is conducted from the outlet passage 13 by a pipe 34.

The vents 29, three being shown in Fig. 4 of the drawing, operate very satisfactorily to prevent an abnormal gaseous pressure being built up above the level of the liquid surrounding the filter 30. If such gaseous pressure is not relieved, it may depress the liquid below the lower end of the porous filter cup 30 and thereby starve the engine of fuel and cause it to stop. These small vents 29 will serve to relieve the pressure around the outside of the cup 27 by permitting the gas to pass through these vents into the interior of this cup, as indicated by the arrow in Fig. 3, and thus equalize the gaseous pressure inside and outside of this cup. Furthermore, if the porous filter 30 through long use has become clogged with dirt so that the gasoline cannot pass therethrough, this gasoline will rise in the bowl 11 until it reaches the level of the vents 29 to by-pass the filter cup and pass inside of the cup 27 to escape through the outlet port 13. The bridge member 21, it will be noted, is made relatively wide so that it overlies the vents 29 and shields them so that the gasoline which enters through the port 12 and drops down at either side of the bridge member into the glass bowl cannot reach these vents and avoid passing through the fibrous filter cup 30.

The entire filter unit shown in Fig. 3 of the drawing is made of inexpensive material to be sold as a complete assembly unit, so that when the porous filter cup 30 has become clogged through long use, the unit can be discarded and replaced with a new filter unit at very slight cost. To do this, all that is necessary is to unscrew the nut 17 by hand so as to release the bridge member 21 and replace the clogged filter unit with a new filter unit, and then tighten up the nut 17, whereupon the job of replacing the filter unit is finished.

Having thus described my invention, what I claim and desire to protect by Letters Patent is:

A volatile liquid filter, comprising a head having an inlet passage and an outlet passage and a central bore extending upwardly to the outlet passage, a dirt collecting bowl attached to the head; and a filter unit removably secured in said bowl and including a bridge plate clamped between the head and bowl and having an inverted cup supported thereby, and also a porous filter cup permanently attached to the lower portion of the inverted cup so that the liquid to be filtered passes through the filter walls to said central bore, and said inverted cup being provided with a vapor vent at its upper end beneath said bridge plate and shielded thereby.

References Cited in the file of this patent
UNITED STATES PATENTS

| | | |
|---|---|---|
| 2,007,336 | Malivert | July 9, 1935 |
| 2,057,219 | Vokes | Oct. 13, 1936 |
| 2,646,885 | James | July 28, 1953 |